US005203574A

United States Patent [19]

[11] Patent Number: 5,203,574

[45] **Date of Patent: * Apr. 20, 1993**

Stolzenfeld

[54] LIQUID TRANSPORTING AND MIXING CONTAINER

[76] Inventor: George P. Stolzenfeld, 9465 Deerpark Ct., Fenton, Mich. 48430

[ * ] Notice: The portion of the term of this patent subsequent to Apr. 7, 2009 has been disclaimed.

[21] Appl. No.: 837,371

[22] Filed: Feb. 14, 1992

Related U.S. Application Data

[63] Continuation of Ser. No. 666,346, Mar. 8, 1991, Pat. No. 5,102,151.

[51] Int. Cl.[5] .......................... F16J 15/06; B01F 7/00

[52] U.S. Cl. .......................................... 277/6; 277/9; 277/14 V; 277/25; 277/30; 277/133; 220/295; 366/331; 366/349

[58] Field of Search .................... 277/30, 31, 81 R, 25, 277/13, 14 R, 14 V, 6, 9, 133, 25, 82, 83, 93 R, 935 D; 366/331, 308, 347, 349, 281, 284, 286, 199, 244, 249, 289; 220/293, 295

[56] References Cited

U.S. PATENT DOCUMENTS

| | | | |
|---|---|---|---|
| 1,168,002 | 1/1916 | Hirth | 277/81 |
| 1,498,917 | 6/1924 | Hutchins | 277/30 |
| 2,617,669 | 11/1952 | Ruthman et al. | 277/14 V |
| 4,102,473 | 7/1978 | Draxler | 220/295 X |
| 4,392,583 | 7/1983 | Wong | 220/295 X |
| 4,494,758 | 1/1985 | Carlsson et al. | 277/14 V |
| 4,556,222 | 12/1985 | Lewis et al. | 277/9 |
| 4,599,170 | 7/1986 | Friedman et al. | 366/247 X |
| 4,647,213 | 3/1987 | Hay II | 366/347 X |
| 4,753,534 | 6/1988 | Markle | 366/349 X |
| 4,791,980 | 12/1988 | Hagar et al. | 277/81 R X |
| 5,102,151 | 4/1992 | Stolzenfeld | 277/6 |

FOREIGN PATENT DOCUMENTS

| | | | |
|---|---|---|---|
| 0816341 | 8/1937 | France | 220/40 R |
| 0616747 | 2/1961 | Italy | 277/30 |

*Primary Examiner*—William A. Cuchlinski, Jr.
*Assistant Examiner*—James K. Folker
*Attorney, Agent, or Firm*—Reising, Ethington, Barnard, Perry & Milton

[57] ABSTRACT

A mixing tank for a liquid is disclosed with a built-in agitator having a shaft extending through an upper wall of the tank for engagement with a drive motor module. For shipping purposes, the shaft opening is sealed against leakage of the liquid by a seal ring which is compressed by a seal clamp between a collar fixedly mounted on the shaft and a fixed member on the upper wall of the tank. When the agitator is operated at a work station to mix the liquid, the seal clamp is released and the agitator shaft is driven by the drive motor module. In order to prevent liquid leakage around the shaft during shaft rotation, a rotor is mounted on the shaft inside the tank and the liquid which migrates up the shaft to the rotor is thrown outwardly thereby.

4 Claims, 3 Drawing Sheets

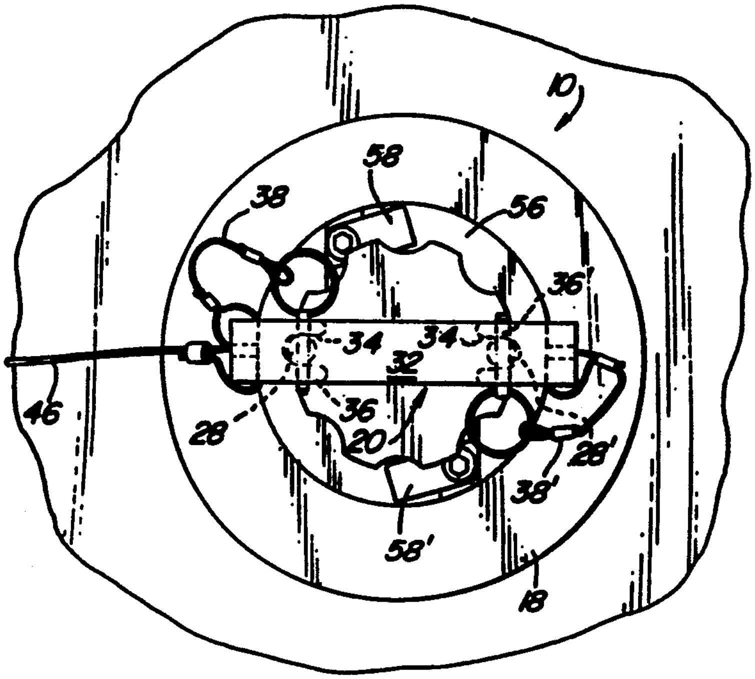
IFig-1
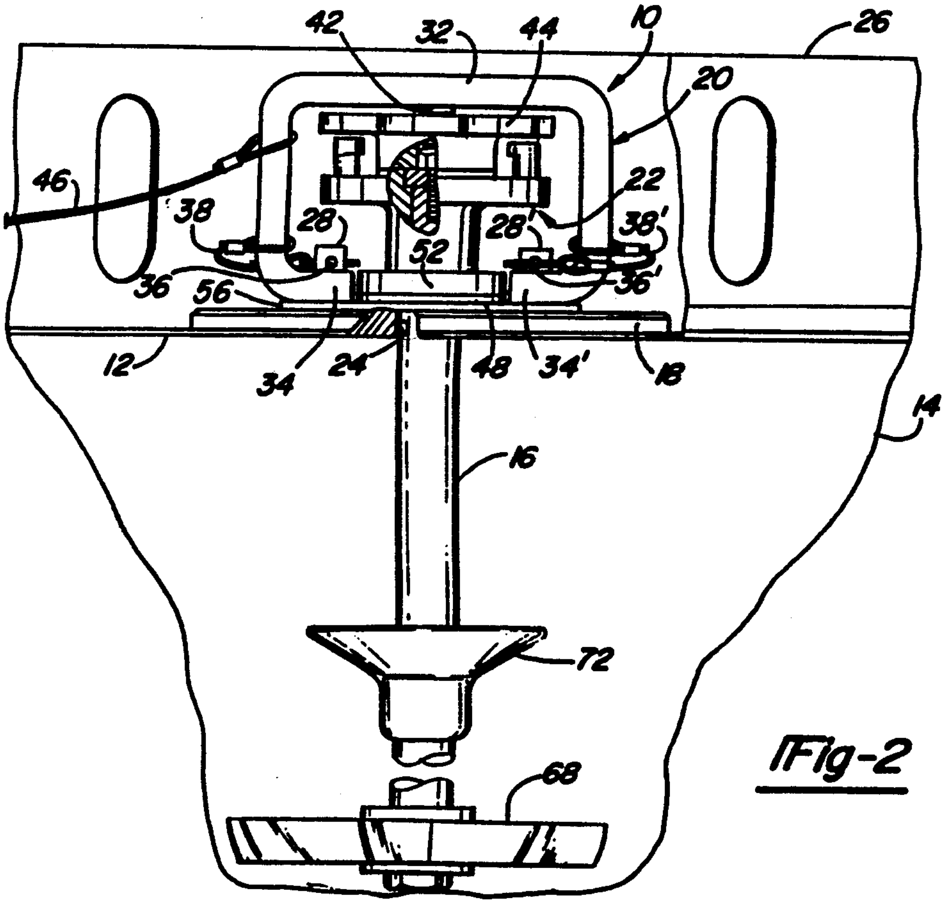
IFig-2

LIQUID TRANSPORTING AND MIXING CONTAINER

This is a continuation, of application Ser. No. 07/666,346 filed on Mar. 8, 1991 now U.S. Pat. No. 5,102,151.

FIELD OF THE INVENTION

This invention relates to a liquid transporting container of the type which is fitted with a mixing device or agitator. More particularly, this invention relates to means for preventing leakage of the liquid around the shaft during transport and during use of the mixing device at a work station.

BACKGROUND OF THE INVENTION

It is a common practice in some industries to ship or transport certain liquids in a shipping container or tank which is also used as a supply tank for the same liquid at a work station in the user's facility. For example, in the auto industry paint is shipped by truck or rail from the paint manufacturer's facility to the auto manufacturer's facility where it is used for painting cars. The tanks may hold about two hundred gallons or more and are typically of rectangular shape for efficiency in shipping. When the tanks reach the destination facility, they are placed near a work station and used as the supply tank for the painting operation on the production line. The paint in the tank must be stirred or agitated at the work station in order to maintain a uniform composition throughout the tank. For this purpose, the tank is provided with a mixing device which comprises an impeller inside the tank mounted on a shaft which extends through a bearing in the top of the tank for connection with an externally mounted drive motor. The drive motor is part of a drive module which is adapted for connection to the impeller shaft when the tank is installed at the work station and is disconnected when the empty tank is removed from the work station. Such mixing tanks meet the needs of industry for various liquids which require mixing or agitation at the work station where the liquid is used. However, there has been a long standing problem of providing a trouble free seal for preventing leakage of the liquid around the agitator shaft during shipping and also during operation of the mixing device.

A prior art arrangement for sealing the agitator shaft in a mixing tank is disclosed in the Bissell U.S. Pat. No. 2,137,328 granted Nov. 22, 1938. In this arrangement, a cylindrical stuffing box is mounted in the wall of the tank and the agitator shaft extends through the stuffing box. The shaft seal comprises a plurality of packing rings which are stacked on one another in the sleeve of the stuffing box. The rings are compressed against the bottom of the sleeve by a clamping ring which is tightened by a threaded fastener. This type of arrangement is not satisfactory because the packing rings in the stuffing box require a great deal of cleaning and maintenance to ensure that a good seal is achieved during transport and during operation of the agitator. A similar shaft seal arrangement is disclosed in the Werner U.S. Pat. No. 4,127,310 granted Nov. 28, 1978.

Another prior art arrangement for an agitator shaft seal is described in the Boutros et al U.S. Pat. No. 2,911,240 granted Nov. 3, 1959. This patent refers to the prior art stuffing box construction using packing rings and a gland for compressing the rings around the shaft, as described above with reference to the Bissell patent. The Boutros et al patent also describes the difficulty of obtaining a seal with the stuffing box construction because of seepage through the packing along the shaft with an attendant contamination and maintenance problem. The Boutros et al patent discloses a so-called "mechanical seal" for an agitator shaft which affords a substantially fluid tight seal which is constructed so that a damaged seal may be replaced without disassembly or removal of the shaft from the apparatus. The mechanical seal comprises a stationary sealing ring of metal which is supported through intermediate members on the wall of the tank. A second sealing ring of low friction material, such as carbon or brass, is mounted on the shaft for rotation therewith. The sealing rings have polished axial faces which are held in sealing engagement with each other by a spring. In the event of breakage or other failure of a seal ring, an auxiliary sealing means is provided to seal the shaft opening while the sealing ring is repaired. The auxiliary sealing means comprises a ring-shaped member nonrotatably mounted on the shaft and carrying an O-ring seal on its periphery. The shaft is axially movable to engage the auxiliary sealing means with a stationary collar which receives the O-ring in sealing engagement. The auxiliary sealing means is locked in place by a small angular rotation of the shaft to engage a pair of locking lugs with a thread element or ramp to maintain the auxiliary sealing means in position during repair.

Other prior art arrangements which provide an agitator shaft shut-off seal similar to that of the Boutros et al patent are disclosed in the Liddiard U.S. Pat. No. 4,419,015 granted Dec. 6, 1983 and the Larkins U.S. Pat. No. 4,878,677 granted Nov. 7, 1989. These patents both describe a stuffing box seal for an agitator shaft together with a shut-off seal which is closed when the shaft is axially displaced.

A fluid mixing unit for portable containers comprising an impeller module affixed to the container and a power module which is demountably secured to the impeller module is disclosed in the LeMaster U.S. Pat. No. 4,813,786 granted Mar. 21, 1989. In this device, the shaft is sealed by a pair of packing rings which are mounted in an end cap which surrounds the shaft and is supported by a sleeve or barrel member extending into the tank. When the drive module is removed from the impeller module, the opening through the mounting flange in the wall of the tank is closed by a threaded sealing plug.

A general object of this invention is to provide an improved arrangement for preventing leakage around an impeller shaft of a mixing tank and to overcome certain disadvantages of the prior art.

SUMMARY OF THE INVENTION

This invention provides an improved sealing arrangement for an agitator shaft of a mixing tank; it assures a good seal during shipping of the tank and also during operation of the agitator shaft. This is accomplished by utilizing a seal ring which is axially clamped between a collar fixedly mounted on the shaft and fixed member on the wall of the tank during transport of the tank and by utilizing a rotor mounted on the shaft for centrifugally slinging liquid from the shaft to prevent leakage while the agitator is in operation.

In accordance with this invention, apparatus is provided to prevent leakage around a rotatable shaft extending through an upper wall of a container. The upper wall includes a member with a first sealing surface on the outside thereof and a seal ring surrounds the shaft and engages the sealing surface. A collar is mounted on the shaft for rotation therewith outside the upper wall and has a second sealing surface for engaging the seal ring. A seal clamp includes wedging means for forcing the collar toward the upper wall and compressing the seal ring therebetween to prevent leakage when the wedging means is tightened. A rotor is mounted on the shaft for rotation therewith adjacent the inside of the upper wall; the rotor has a radial dimension greater than the shaft whereby liquid which migrates up the shaft during rotation thereof is thrown outwardly by centrifugal force to prevent leakage when the wedging means is released and the shaft is rotated.

Further, in accordance with this invention, the wedging means comprises retaining means on the upper wall of the container and bridging means is detachably connected therewith and extends transversely of the shaft and supports a threaded stud. A manually grippable handle in threaded engagement with the stud is adapted for clamping the collar by rotation in one direction and unclamping the collar by rotation in the opposite direction.

Further, in accordance with this invention, the wedging means comprises a retaining element mounted on the upper wall and a retained element on the collar, said elements being engagable with each other upon rotation of the shaft in one direction, one of the elements comprising a ramp for clamping the seal ring between the collar and the upper wall when the shaft is rotated in one direction for unclamping it when the shaft is rotated in the opposite direction.

Further, in accordance with the invention, the rotor comprises a conical member mounted on the shaft with its largest radius at the upper edge thereof.

Further, in accordance with this invention, the shaft is slidably mounted in the upper wall whereby it may be retracted into the container for transport and may be extended out of the container for connection to a motor drive module for the agitator shaft. Clamping means are provided for holding the shaft in the retracted position and pressing the seal ring between the sealing surfaces when the clamping means is tightened. The shaft is movable to the extended position when the clamping means is released and a coupling member on the upper end of the shaft is engagable with the shaft of a motor module in the extended position. A rotor mounted on the agitator shaft for rotation therewith is positioned adjacent the inside of the upper wall when the shaft is in the extended position and prevents liquid from reaching the opening around the agitator shaft when the clamping means is released and the shaft is rotated by the motor module.

A complete understanding of this invention may be obtained from the detailed description that follows taken with the accompanying drawings.

DESCRIPTION OF THE DRAWINGS

FIG. 1 is a top plan view of a first embodiment of the shaft seal mechanism;

FIG. 2 is a side elevation view of the shaft seal mechanism of FIG. 1;

BEST MODE FOR CARRYING OUT THE DRAWINGS

Figure 3:
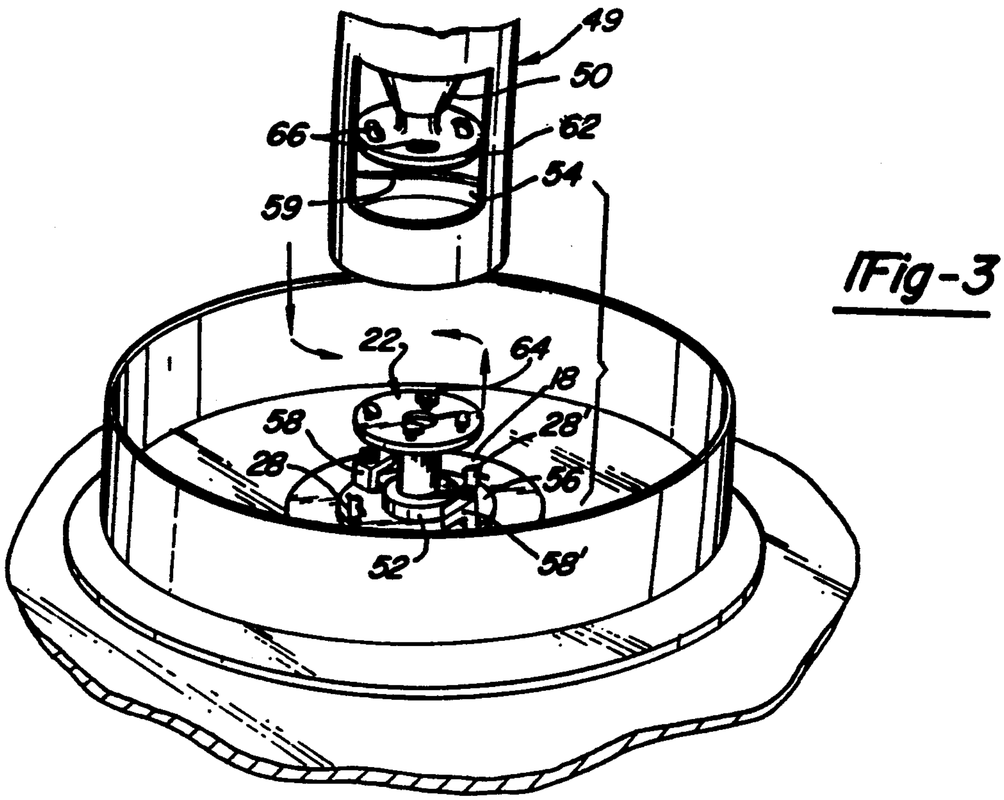
FIG. 3 is a perspective view of the shaft seal mechanism and drive motor module for operation of the agitator shaft.

Referring now to the drawings, there is shown an illustrative embodiment of the invention in a shaft seal for a liquid container with an agitator drive shaft. It will be appreciated, as the description proceeds, that this invention is useful in different applications and may be realized in a variety of embodiments.

The first embodiment of the invention will be described with reference to FIGS. 1, 2 and 3. The agitator shaft seal mechanism 10 of this invention is installed in the cover plate or upper wall 12 of a container or tank 14 for a liquid. An agitator shaft 16 is mounted for rotation in a mounting flange 18 and extends therethrough to a coupling member 22 which is drivingly connected with the shaft. The shaft 16 is supported for rotation in the flange 18 by a sleeve bearing 24 which is suitably made of nylon. The bearing 24 is press fitted into the bore in the flange 18. The top of the tank is provided with a guard ring 26 which encircles the shaft seal mechanism 10 to protect it from accidental damage.

As depicted in FIGS. 1 and 2, the shaft seal mechanism 10 is in its retracted position for sealing the shaft opening against leakage of liquid during shipping and handling of the tank. In this retracted position, the shaft 16 is fully inserted into the tank and is stationary. For sealing the stationary shaft 16, the shaft seal mechanism 10 comprises a seal clamp 20 which coacts with a seal ring 48. The seal clamp 20 comprises a retaining means in the form of a pair of diametrically opposite studs 28 and 28' which extend perpendicularly from the upper face of the flange 18 and are integral therewith. A clamp member 32 having a C-shaped configuration has opposed bifurcated ends 34 and 34' which respectively straddle the studs 28 and 28'. The C-shaped clamp member 32 bridges the coupling member 22 and is held captive on the studs 28 and 28' by removable pins 36 and 36', respectively. The pins are retained on the clamp member 32 by respective rings and lanyards 38 and 38'. In order to provide a clamping action through the clamp member 32, a threaded stud 42 is fixedly mounted in a central position on the clamp member 32 in line with the shaft 16. A manually rotatable handle 44 is threadedly mounted on the stud 42 and is adapted to engage the central portion of the coupling member 22. The handle 44 is provided with a peripheral configuration and diameter to accommodate manual gripping and rotation thereof on the threaded stud 42 in either an advancing or retracting direction relative to the clamp member 32. The clamp member 32 is retained by a lanyard 46 to the guard ring 26 when the clamp member is removed from the studs 28 and 28'.

The liquid tight sealing around the shaft 16 at the flange 18 is provided during transport by the seal ring 48 in the form of a flat washer. The seal ring 48 is disposed over the shaft 16 and is seated against a flat upper sealing surface of the flange 18. An annular base flange or collar 52 on the coupling member 22 has a flat sealing surface which is seated on the seal ring 48. The liquid tight seal is achieved at the shaft opening by rotating the handle 44 in the advancing direction and the wedging action of the screw threads causes the handle to press against the coupling member 22 and exert a clamping force tending to compress the seal ring 48.

When the tank 14 and liquid therein has been transported to its destination for use, the clamp member 32 is removed by loosening the clamp handle 44 and removing the pins 36 and 36' from the studs 28 and 28'. With the clamp member 32 removed, as shown in FIG. 3, a drive module 49 including a motor 50 is installed for driving the shaft 16. The drive module 49 is mounted on the flange 18 for driving the agitator shaft 16 when the tank is placed in use. For this purpose, the drive module casing is provided with an adaptor collar 54 which seats on the flange 18 and surrounds a circular boss 56 on the upper surface of the flange 18. The boss 56 carries a pair of adaptor locking lugs 58 and 58'. Each of the lugs is L-shaped with one end seated in a retaining groove in the boss 56 and held by a cap screw to the flange 18. The adaptor collar 54 has a pair of oppositely disposed lug ramps 59 (only one shown) each of which coacts with one of the lugs 58 and 58'. The motor 50 is locked in place by seating the adaptor collar 54 on the flange 18 and rotating the drive module counterclockwise to wedge the lug ramps under the respective locking lugs 58 and 58'. Then, the coupling member 22 is pulled upwardly, carrying the agitator shaft 16 with it, to engage with a motor shaft coupling member 62. The coupling member 22 carries on its upper face a set of four coupling lugs 64 each in the form of an L-shaped stud. These coupling lugs 64 are located for alignment with a set of mating slots 66 in the motor shaft coupling member 62. The coupling member 22 is lifted to insert the coupling lugs through the corresponding slots and rotated in a counterclockwise direction to wedge the lugs into engagement with the motor shaft coupling member 62. The drive module 49 with the adapter collar 54 and locking lugs, as well as the shaft coupling members 22 and 62, are of known construction.

With the tank in use, the motor 50 rotatively drives the agitator shaft 16 and the impeller 68 which is immersed in the liquid in tank 14. In order to eliminate any leakage of the liquid through the shaft opening in the flange 18, a rotor in the form of a centrifugal slinger 72 is mounted on the shaft 16 for rotation therewith. When the shaft 16 is pulled upwardly for coupling with the motor, the slinger 72 moves with the shaft into proximity with the tank cover 12 under the flange 18. The rotational motion of the shaft 16 causes the liquid in the tank to tend to climb upwardly on the shaft below the slinger 72 and onto the lower surface of the slinger. Because of the inverted cone shape of the slinger 72, liquid on the cone surface thereof climbs toward the upper edge and is thrown outwardly by centrifugal force. Thus, the shaft opening through the flange 18 is shielded from liquid and leakage is eliminated.

Figure 4:
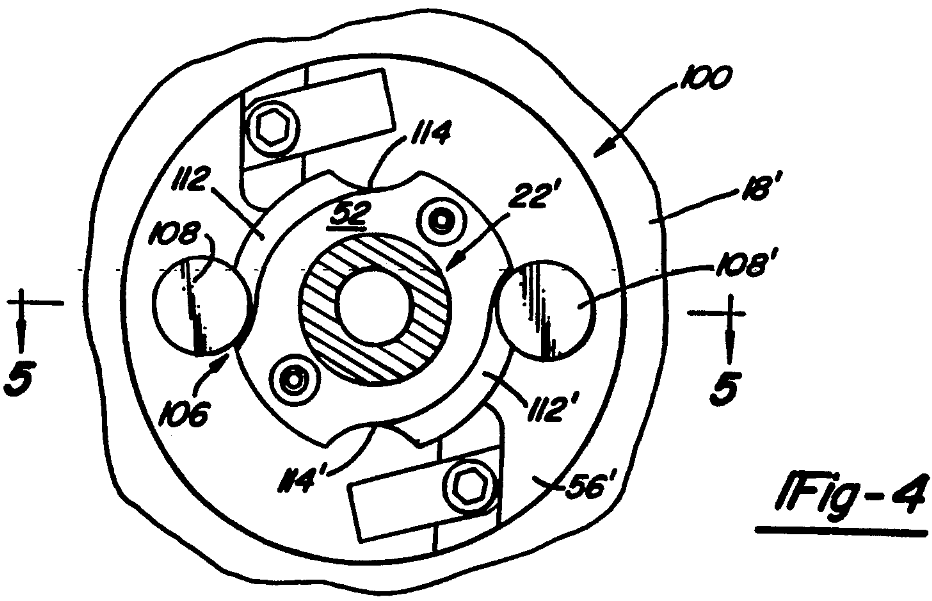
FIG. 4 is a top elevation view of a second embodiment of the shaft seal mechanism of this.
Figure 5:
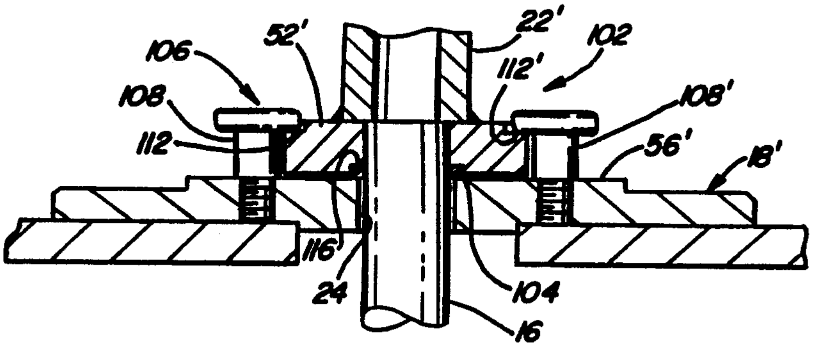
FIG. 5 is a sectional view taken on lines 5—5 of FIG. 4.
Figure 6:
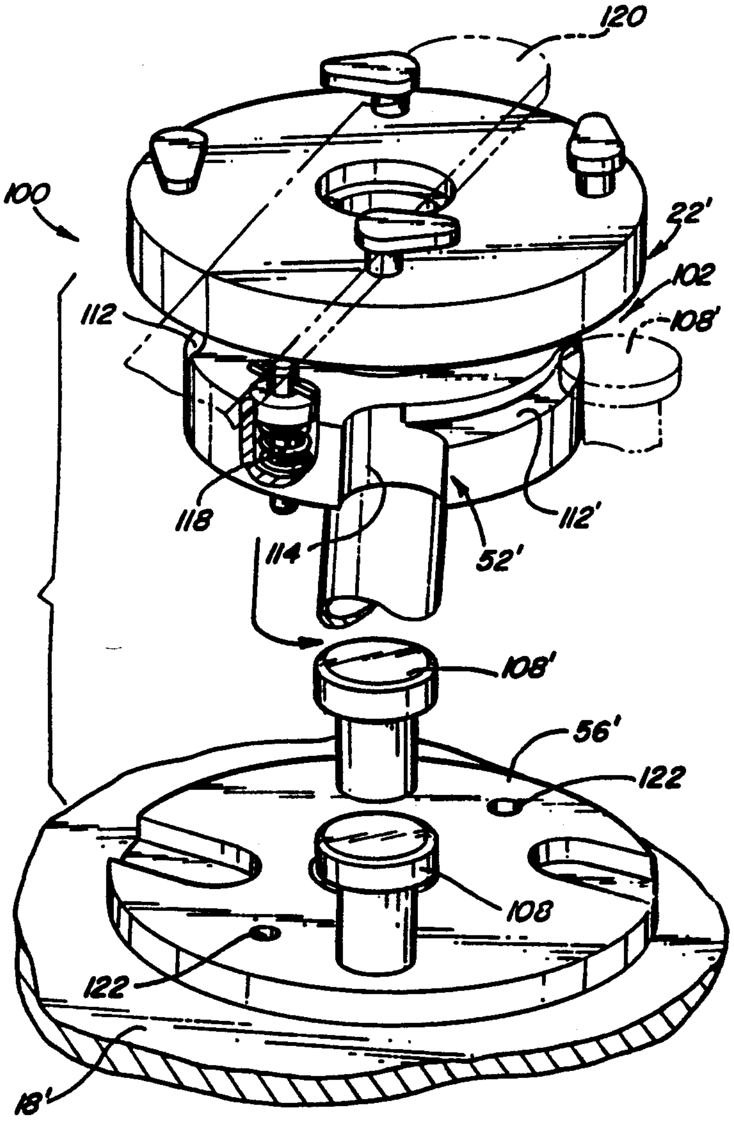
FIG. 6 is a perspective, exploded view of the shaft seal mechanism of FIGS. 4 and 5.

The second embodiment of the invention will be described with reference to FIGS. 4, 5 and 6. This embodiment of the invention is adapted for the same purpose and type of tank installation as the first embodiment described above. It is also adapted for use with the same type of motor drive module as described above. Accordingly, the description of the tank structure and the motor drive module will not be repeated. In this second embodiment, the shaft seal mechanism 100 is provided for the shaft 16 to maintain a liquid tight seal during transport of the tank with the shaft stationary and also during use of the tank when the shaft 16 is motor driven. For sealing during transport with the shaft 16 stationary, the shaft seal mechanism 100 comprises a seal clamp 102 which coacts with an O-ring seal 104, as best shown in FIG. 5. For preventing leaking during shaft rotation, the rotor or centrifugal slinger 72 on the shaft 16 is operative, as described above with reference to the first embodiment of FIGS. 1, 2 and 3.

The seal clamp 102 comprises, in general, the base collar 52' on the coupling member 22' and the mounting flange 18' together with a clamp means 106. The clamp means 106 comprises a pair of retaining elements in the form of headed studs 108 and 108' which are mounted in the mounting flange 18'. The studs 108 and 108' are disposed adjacent the periphery of the base flange 52' at diametrically opposite locations and are secured by threaded shanks in the flange 18'. Each of the studs 108 and 108' has a disk-like head which overlies the peripheral edge of the base collar 52' and is adapted to engage retained elements in the form of respective ramps 112 and 112' on the base collar 52'. To provide clearance of the base collar 52' from the heads of studs 108 and 108', the base flange 52' is provided with diametrically opposite arcuate notches 114 in the periphery thereof. As best shown in the exploded view of FIG. 6, when the shaft 16 with coupling member 22' is properly oriented, the coupling member 22' may be placed in a retracted position with the base collar 52' seated on the boss 56' and it may be lifted to an extended position with the base collar 52' above the studs 118 and 118'. The ramps 112 and 112' are inclined relative to the plane of the lower surface of the base collar 52' so that rotation of the coupling member 22' in a counterclockwise direction causes a wedging action between the respective ramps and headed studs tending to force the base collar 52' toward engagement with the boss 56'. A suitable wrench such as the wrench 120 shown in phantom lines in FIG. 6 may be used for rotating the coupling member 22'.

The O-ring seal 104 mentioned above, and best shown in FIG. 5, is fitted around the shaft 16 and is accommodated in an annular groove 116 in the lower surface of the base collar 52'. When the base collar 52' is disposed beneath the headed studs 108 and 108' and rotated counterclockwise, the O-ring seal 104 is compressed between the collar 52' and the boss 56' to provide a liquid tight seal around the shaft opening.

In order to lock the coupling member 22' in the rotative position which compresses the O-ring seal 104, a spring loaded pin 118 is provided. The pin 118 is disposed adjacent the periphery of the base collar 52' and is adapted to be aligned with one of a pair of holes 122 in the boss 56'. When the pin and hole are in alignment, the pin is pushed into the hole by the spring and the pin must be manually lifted out of the hole to permit rotation of the base collar 52'.

When the tank or liquid container 14 is to be placed in use, the seal clamp 102 is released and the agitator shaft is coupled with the drive motor 50. This is accomplished by pulling the pins 118 and rotating the coupling member 22' in a counterclockwise direction until the heads of the studs 108 and 108' are aligned with respective notches 114. It may be necessary to use the wrench 120 to rotate the coupling member 22' to loosen the seal clamp 102. In this condition, the coupling member 22' may be manually lifted for connection with the drive motor 50. The motor 50 is installed on the tank 14 as described above with reference to FIG. 3 and the coupling member 22' is engaged with the motor shaft coupling member 62 in the manner described above. With the agitator shaft 16 in its extended position, the rotor 72 is disposed adjacent the upper wall 12 and serves to prevent leakage around the shaft 16 during shaft rotation, as described above.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. Apparatus for preventing liquid leakage around a rotatable shaft extending into a container of liquid, said apparatus comprising:

a rotatable shaft extending through a wall of said container, said wall having a first sealing surface on the outside thereof, a collar mounted on said shaft for rotation therewith outside said wall and having a second sealing surface for engaging said first sealing surface, a seal clamp including wedging means for forcing said sealing surfaces together when said wedging means is tightened and for allowing axial movement of said shaft when said wedging means is disengaged.

2. The invention as defined in claim 1 wherein said wedging means comprises:

retaining means secured to said container, bridging means detachably connected with said retaining means and extending transversely of said shaft and supporting a threaded stud, and a manually grippable handle in threaded engagement with said stud for clamping said collar by rotation in one direction and unclamping said collar by rotation in the opposite direction.

3. The invention as defined in claim 1 wherein said wedging means comprises:

a retaining element mounted on said outer wall, a retained element on said collar, said retaining element and retained element being engagable with each other upon rotation of said shaft in one direction, one of said elements comprising a ramp for clamping said sealing surfaces between said collar and upper wall when the shaft is rotated in said one direction and for unclamping said sealing surface when said shaft is rotated in the opposite direction.

4. The invention as defined in claim 1 wherein said wall is an upper wall and including:

a rotor mounted on said shaft for rotation therewith adjacent the inside of said upper wall, said rotor having a radial dimension greater than said shaft, whereby liquid which migrates up said shaft during rotation thereof to said rotor is thrown outwardly thereof by centrifugal force for preventing leakage when said wedging means is released and said shaft is rotated.

* * * * *